UNITED STATES PATENT OFFICE.

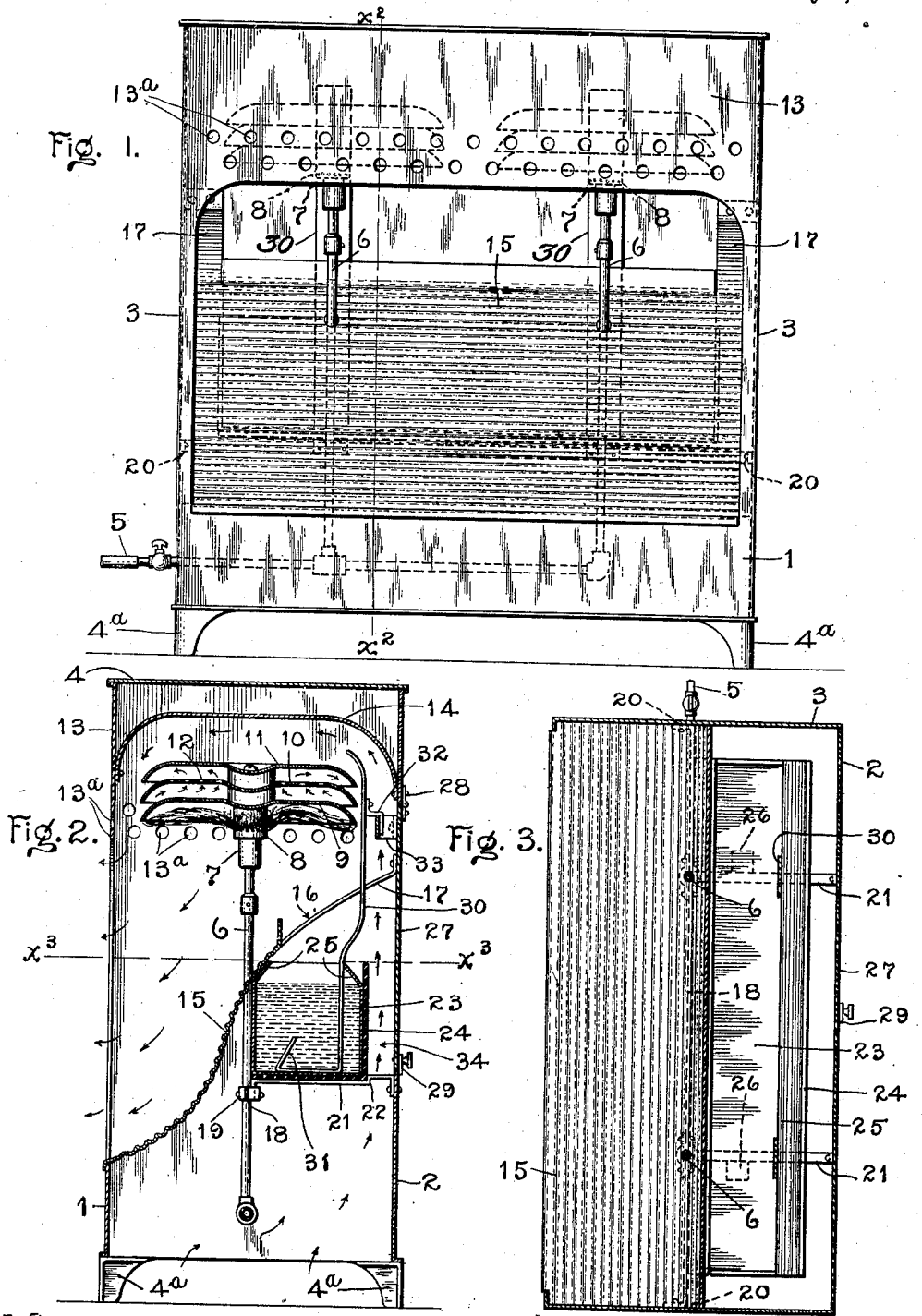

WILLIAM AKIN, OF LOS ANGELES, CALIFORNIA.

GAS-HEATER.

991,408.	Specification of Letters Patent.	Patented May 2, 1911.

Application filed April 25, 1910. Serial No. 557,597.

*To all whom it may concern:*

Be it known that I, WILLIAM AKIN, a citizen of the United States, residing at Los Angeles, in the county of Los Angeles and State of California, have invented a new and useful Gas-Heater, of which the following is a specification.

This invention relates to gas heaters, and one of the objects of the invention is to provide efficient means for preventing the heat from rising directly above the heater and cause the heat to be projected from the heater into the room toward the floor.

Another object is to provide for supplying moisture to the heated air and to hide the water receptacle used for that purpose, enabling it to be placed below the heat elements, and a further object is to conduct heat downwardly from the heating elements to the water in the receptacle for raising its temperature sufficiently to produce the required amount of vapor.

A further object is to provide for easily removing the water receptacle through the back of the heater, also enabling the receptacle to be easily refilled without removal.

A further object is to provide a reflector which will act to reflect the heat into the room and at the same time hide the receptacle containing the water and the greater portion of the pipes leading to the burners.

A further object is to provide a multiplicity of spreaders above each burner and to so construct an intermediate spreader that a radial draft will be produced between the spreaders which will act to draw in unconsumed gas and ignite the same between the spreaders and then be delivered radially outward from underneath the upper spreader.

Referring to the drawings:—Figure 1 is a front elevation of the heater. Fig. 2 is a vertical section on line $x^2$—$x^2$ Fig. 1. Fig. 3 is a horizontal section on line $x^3$—$x^3$ Fig. 2.

The heater comprises a sheet metal casing having a front wall 1, back wall 2, and end walls 3 with a top 4, and being open at the bottom, as shown in Fig. 2, and preferably provided with legs 4ª to permit air to enter in at the bottom. Extending through one of the side walls 3 is the gas inlet pipe 5, and extending upwardly therefrom are two pipes 6 which conduct gas to burners 7. Any preferred form of burner may be employed. The gas issuing from each burner 7 through orifices 8 is ignited and the heat prevented from passing upwardly by the lower spreader 9. Above the lower spreader 9 is an intermediate spreader 10, and above the intermediate spreader 10 is an upper spreader 11. Three or more spreaders may be employed. The middle spreader 10 is provided with orifices 12 and any unburned gas which is deflected and passes above the lower spreader 9 is caught by an inward draft formed by the perforations 12 in the intermediate spreader and is drawn radially inward and is consumed between the spreaders, resulting in perfect combustion, thereby removing all disagreeable odor in the room which generally is present with gas heaters. The heat from the gas thus burned passes out from underneath the upper spreader 11 and is projected forwardly out of the heater.

At the upper part of the casing is a front wall forming a hood 13 which projects down far enough to hide the spreaders, as clearly shown in Fig. 1. Perforations 13ª are formed in the hood 13 and in the end walls 3, about in line with the lower spreaders which allow air to enter to promote combustion. Above the spreaders in the upper part of the casing is a false top 14 curved as shown in Fig. 2 and acting to prevent heat from passing upwardly from the spreaders and causing it to be projected forwardly out from under the hood 13. In order to reflect the heat and at the same time hide the vaporizing means about to be described, I employ a reflector 15 which consists of a polished sheet of copper, preferably curved as indicated in Fig. 2, through which reflector the gas tubes 6 extend. The central portion of the reflector 15 is cut out to form a space 16, thus leaving side straps 17 which extend to the back wall 2 and are riveted thereto near each end of the heater. The reflector is provided with horizontal corrugations to stiffen it.

A bar 18 is secured to the vertical gas pipes 6 by straps 19, and the ends of the bar 18 are riveted at 20 to the ends 3. Extending rearwardly from the bar 18 from each gas pipe 6 is a cross bar 21, each cross bar 21 having an abrupt kink 22, and supported by the bars 18 and 21 is a water receptacle 23, the back and bottom of which have an external covering of asbestos 24. The upper rim 25 of the receptacle 23 is inturned to prevent the water from slopping out. Soldered to the bottom of the receptacle 23 are lugs 26 which bear against the bars 21 and prevent endwise movement of the water receptacle, while the kinks 22 in the cross bars prevent the receptacle from shifting after having been placed in position. In order to enable the water receptacle to be easily placed in position, or removed therefrom, a door 27 is provided in the back of the heater and is hinged at the top at 28 and provided with a catch 29 at its lower end.

The water receptacle is behind and hidden by the reflector 15, and being in this position, and also on account of being below the burners, would not receive sufficient heat to furnish the necessary vapor, and in order to supply the necessary heat I provide a heat conducting strip 30 for each burner, each strip being preferably formed of copper and its lower end being formed with a hook 31 to give an extended area of contact in the water, while the upper end of the strip 30 is supported by means of a hook 32 which is riveted to the strip and which is hooked over a bracket 33 which projects from the back wall of the heater. Each heat conducting strip 30 may be easily removed by lifting to disengage its hook 32 from the bracket 33, and by opening the door 27 the water receptacle may easily be removed for cleaning, and can be refilled without removal.

Back of the water receptacle, a vertical space 34 is formed which is in communication with the bottom part of the heater and acts as a flue up which cold air which enters at the bottom of the heater is conducted and delivered to the space within the heater below the burners. The false bottom 14 causes all of the air which has been heated within the heater to be projected outwardly.

The water receptacle 23, although located back of the reflector 15, is not covered by the reflector at the top, and a clear open space is formed above the water receptacle extending vertically therefrom to the burners, so that the moist air or vapor which ascends from the water receptacle goes directly into the flame. The receptacle being behind the reflector 15, the vapor is prevented from passing forwardly and passing out through the open front of the heater into the room.

The consumption of the air by the flame produces a strong upward suction directly above the water receptacle 23 which sucks the vapors arising therefrom directly into the fire where the vapors are intimately mingled with the heat and pass out into the room, creating a perfect moist heat. These vapors which rise from the water receptacle are not drawn rearwardly by the current ascending at the rear and prevented from reaching the fire because the suction referred to is too great and the fire is in a direct line over the water receptacle. This also reduces the amount of gas used and intensifies the heat.

What I claim is:—

1. In a heater, a casing having a back, side walls, top, and end walls, with an open front and bottom, burners in the upper portion of the casing, a false top above the burners, a reflector below the burners comprising a polished metal sheet arranged angularly with respect to the burners, a water receptacle back of the reflector, and means projecting into said receptacle for conducting heat from the burners to said water receptacle.

2. In a heater, a casing having a back, side walls, top, and end walls, with an open front and bottom, burners in the upper portion of the casing, a false top above the burners, a reflector below the burners comprising a polished metal sheet arranged angularly with respect to the burners, a water receptacle back of the reflector, and a heat conducting strip extending from a point adjacent said burners downwardly into said water receptacle.

3. In a heater, a casing having a back, side walls, top, and end walls, with an open front and bottom, burners in the upper portion of the casing, a false top above the burners, a reflector below the burners comprising a polished metal sheet arranged angularly with respect to the burners, a water receptacle back of the reflector, a heat conducting strip extending from a point adjacent said burners downwardly into said water receptacle, a hook on said strip, and a bracket on the wall of the heater detachably supporting said hook.

4. A heater comprising a casing having a top, back wall, end walls, and an open front and bottom, a door in the back wall, burners in the upper portion of the casing, a reflector below the burners, a water receptacle back of the reflector and forming an air flue between the back wall of the water receptacle and the back wall of the heater, cross bars supporting said water receptacle and provided with means for preventing accidental backward movement of the receptacle, and means on the receptacle for preventing endwise movement of the receptacle.

5. A heater comprising a casing having a top, back wall, end walls, and an open front and bottom, a door in the back wall, burners in the upper portion of the casing, a reflector below the burners, a water receptacle back of the reflector and forming an air flue between the back wall of the water receptacle and the back wall of the heater, cross bars supporting said water receptacle and provided with means for preventing accidental backward movement of the receptacle, and means on the receptacle for preventing endwise movement of the receptacle, vertical gas pipes extending to the burners and extending through said reflector, said cross bars being secured to said gas pipes.

6. A heater comprising a casing having a top, back wall, end walls, and an open front and bottom, a door in the back wall, burners in the upper portion of the casing, a reflector below the burners, a water receptacle back of the reflector and forming an air flue between the back wall of the water receptacle and the back wall of the heater, cross bars supporting said water receptacle and provided with means for preventing accidental backward movement of the receptacle, means on the receptacle for preventing endwise movement of the receptacle, and an outside asbestos covering for the bottom wall, back wall, and end walls of the water receptacle.

In testimony whereof, I have hereunto set my hand at Los Angeles, California, this 16th day of April 1910.

WILLIAM AKIN.

In presence of—
G. T. HACKLEY,
FRANK L. A. GRAHAM.

---

Copies of this patent may be obtained for five cents each, by addressing the "Commissioner of Patents, Washington, D. C."